United States Patent
Kato et al.

(10) Patent No.: US 10,297,833 B2
(45) Date of Patent: May 21, 2019

(54) GAS DIFFUSION ELECTRODE AND METHOD FOR MANUFACTURING THE SAME

(71) Applicant: TORAY INDUSTRIES, INC., Tokyo (JP)

(72) Inventors: Sho Kato, Otsu (JP); Michio Wakatabe, Otsu (JP); Toru Miyake, Otsu (JP); Masaru Hashimoto, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 15/121,533

(22) PCT Filed: Mar. 17, 2015

(86) PCT No.: PCT/JP2015/057856
§ 371 (c)(1),
(2) Date: Aug. 25, 2016

(87) PCT Pub. No.: WO2015/146706
PCT Pub. Date: Oct. 1, 2015

(65) Prior Publication Data
US 2016/0365582 A1    Dec. 15, 2016

(30) Foreign Application Priority Data
Mar. 28, 2014  (JP) .................. 2014-069243

(51) Int. Cl.
*H01M 4/86*  (2006.01)
*H01M 4/88*  (2006.01)
(Continued)

(52) U.S. Cl.
CPC ....... *H01M 4/8605* (2013.01); *H01M 4/8828* (2013.01); *H01M 4/8885* (2013.01);
(Continued)

(58) Field of Classification Search
CPC ..... H01M 2008/1095; H01M 2220/20; H01M 2250/20; H01M 4/663; H01M 4/667; H01M 4/668; H01M 4/8605; H01M 4/8828; H01M 4/8885; H01M 4/96
See application file for complete search history.

(56) References Cited

U.S. PATENT DOCUMENTS

2006/0046926 A1* 3/2006 Ji .................. H01M 4/8605
                                                         502/101
2009/0117433 A1  5/2009 Yamamoto et al.

FOREIGN PATENT DOCUMENTS

CN  101814616 A   8/2010
JP  2007-123227 A  5/2007
(Continued)

OTHER PUBLICATIONS

DuPont Teflon PTFE DISP 30 Fluoropolymer Resin: Product Information, 2012.*
(Continued)

*Primary Examiner* — Carlos Barcena
(74) *Attorney, Agent, or Firm* — Birch, Stewart, Kolasch & Birch, LLP

(57) ABSTRACT

A gas diffusion electrode and a method for manufacturing the same, the gas diffusion electrode being used for a fuel cell and configured by forming a microporous layer containing conductive microparticles and water-repellent resin on at least one surface of a conductive porous base material, wherein the gas diffusibility in the thickness direction thereof is 30% or more, the conductive porous base material has a sliding angle of 70° or less and a porosity of 80% or more, and the microporous layer has a thickness of 10-50 μm inclusive, and a porosity of 60-95% inclusive.

15 Claims, 7 Drawing Sheets

(51) Int. Cl.
    *H01M 4/96*         (2006.01)
    *H01M 8/0243*      (2016.01)
    *H01M 8/0245*      (2016.01)
    *H01M 8/1018*      (2016.01)

(52) U.S. Cl.
    CPC ........... *H01M 4/96* (2013.01); *H01M 8/0243* (2013.01); *H01M 8/0245* (2013.01); *H01M 2008/1095* (2013.01); *H01M 2220/20* (2013.01); *H01M 2250/20* (2013.01); *Y02P 70/56* (2015.11)

(56) References Cited

FOREIGN PATENT DOCUMENTS

| | | |
|---|---|---|
| JP | 2010-192425 A | 9/2010 |
| JP | 2010-225304 A | 10/2010 |
| JP | 2010-232043 A | 10/2010 |
| JP | 2012-190752 A | 10/2012 |
| JP | 2013-171775 A | 9/2013 |
| JP | 2014-222565 A | 11/2014 |
| WO | WO 2011/074327 A1 | 6/2011 |

OTHER PUBLICATIONS

International Search Report for PCT/JP2015/057856 (PCT/ISA/210) dated Jun. 9, 2015.
Written Opinion of the International Searching Authority for PCT/JP2015/057856 (PCT/ISA/237) dated Jun. 9, 2015.
Extended European Search Report dated Jul. 17, 2017, in European Patent Application No. 15770098.0.

* cited by examiner

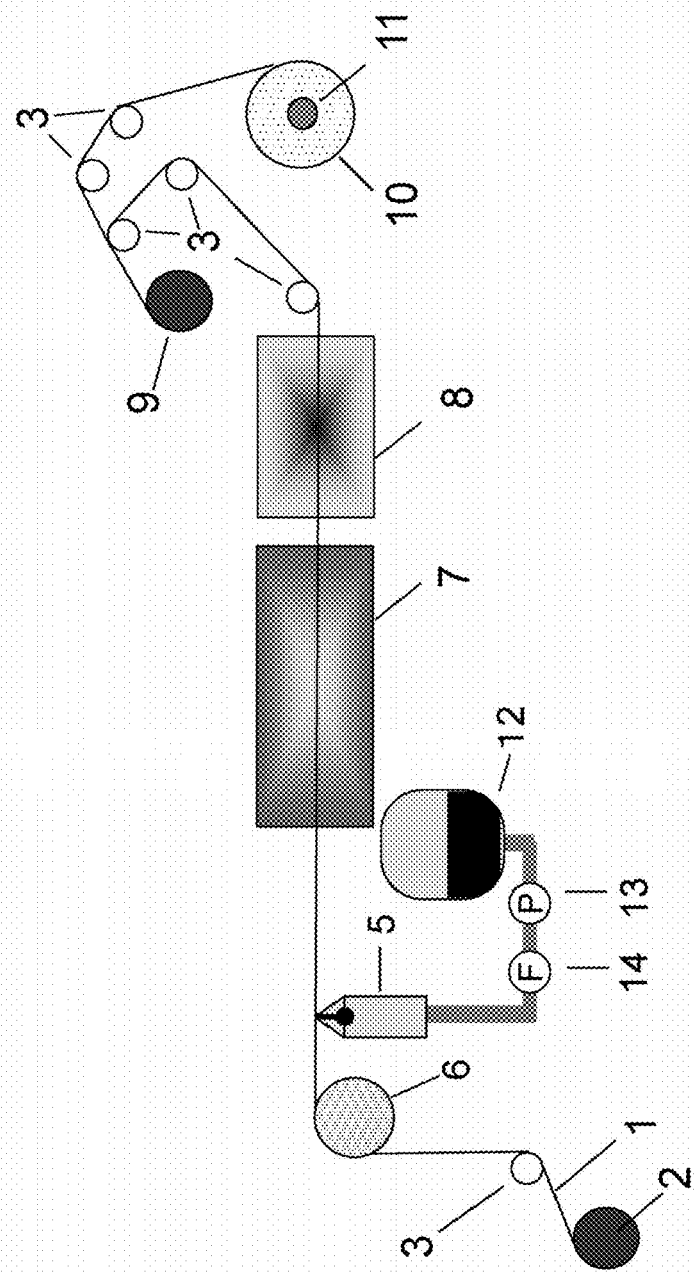

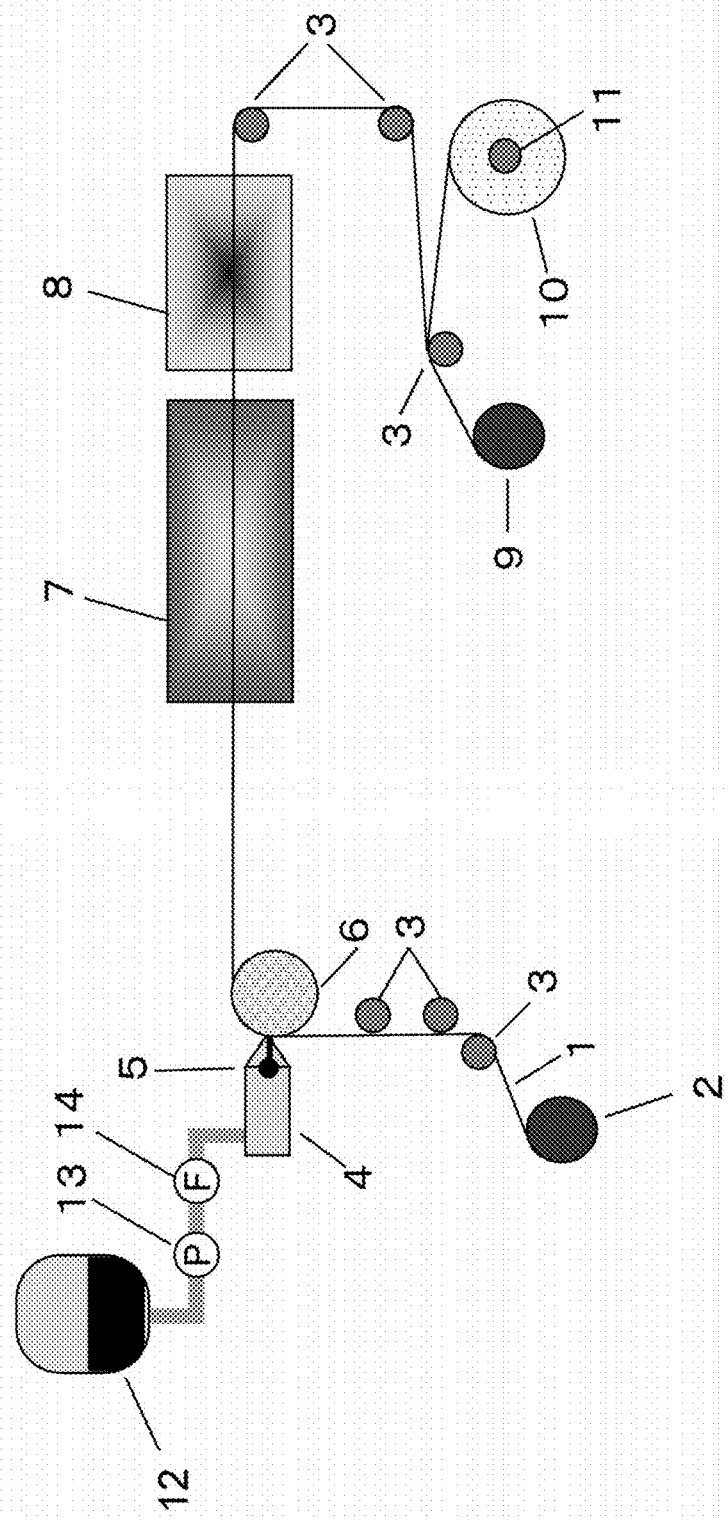

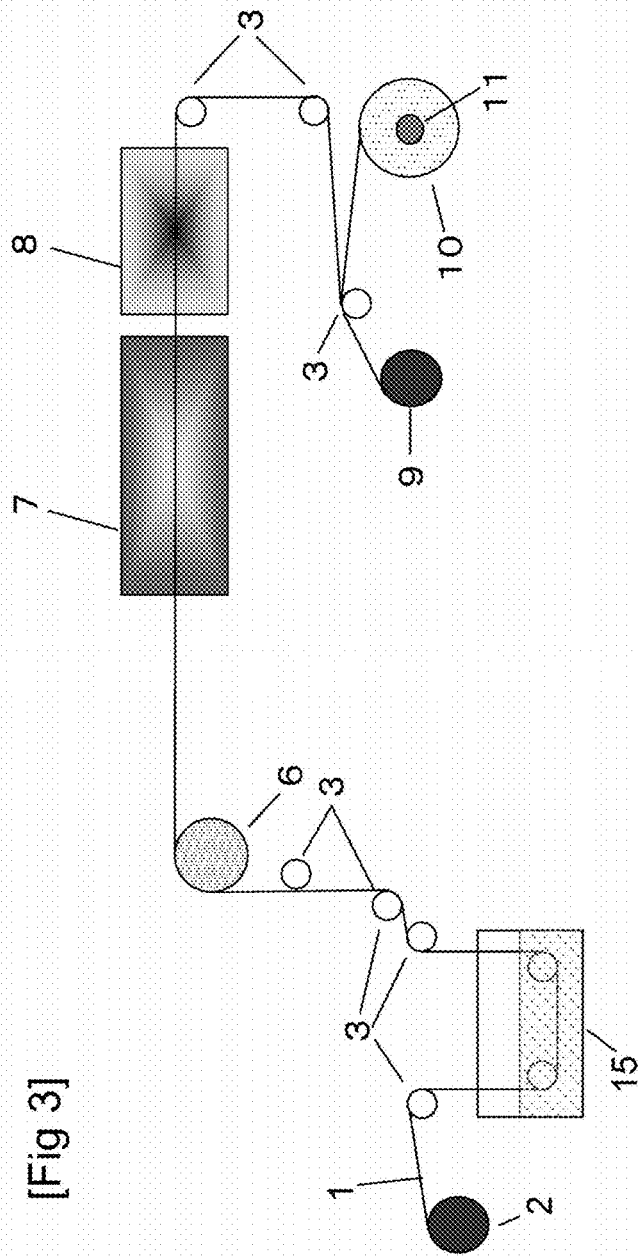

[Fig 4]
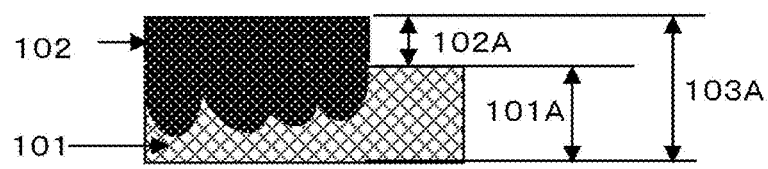

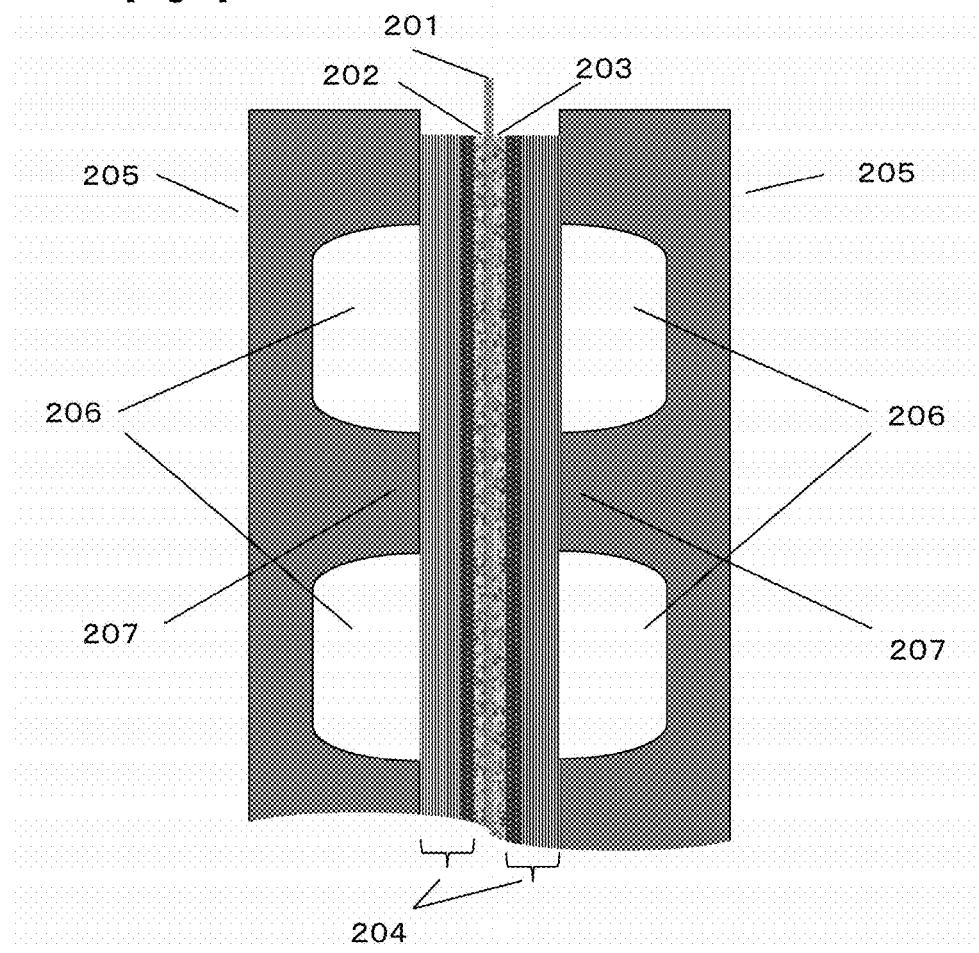

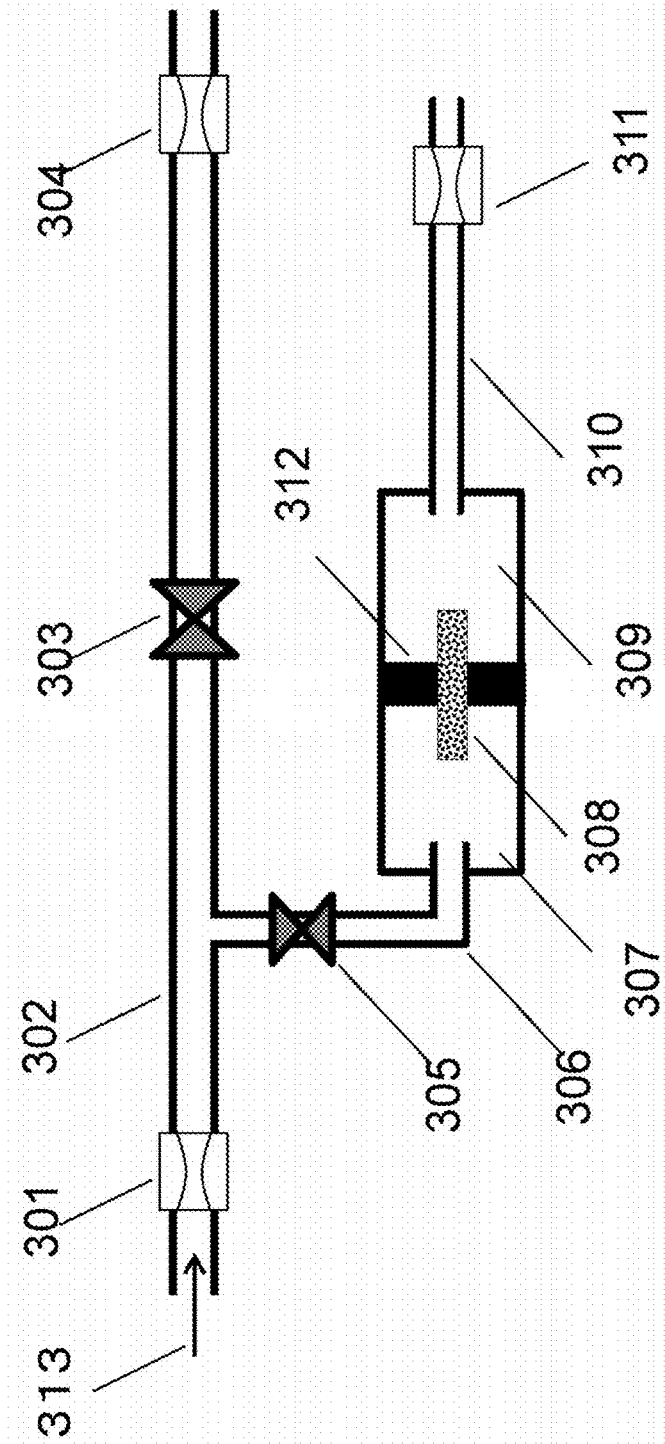
[Fig 6]

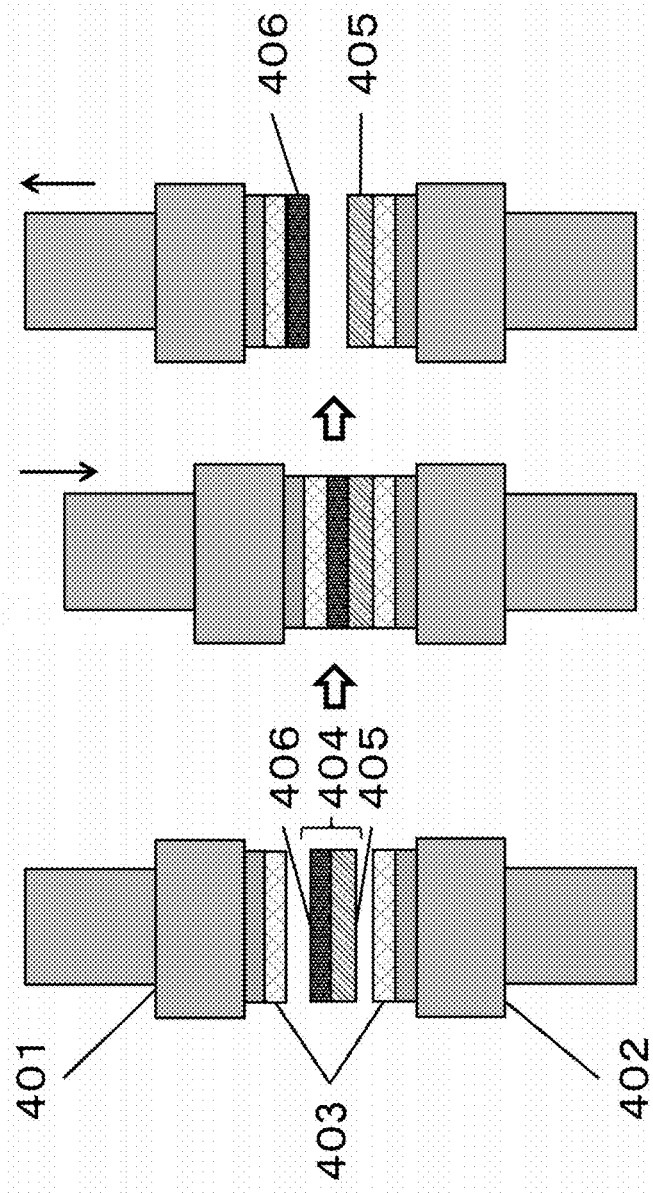

GAS DIFFUSION ELECTRODE AND METHOD FOR MANUFACTURING THE SAME

TECHNICAL FIELD

A fuel cell is a mechanism in which energy generated from a reaction between hydrogen and oxygen to produce water is electrically extracted. Fuel cells have high energy efficiency and only emit water, and thus are expected to serve as clean energy. The present invention relates to a gas diffusion electrode for use in a fuel cell and also to a method for manufacturing the same. Among fuel cells, the invention particularly relates to a gas diffusion electrode for use in a polymer electrolyte fuel cell, which is used as a power supply for fuel cell vehicles, etc., and also to a method for manufacturing the same.

BACKGROUND ART

An electrode for use in a polymer electrolyte fuel cell is sandwiched between two separators in a polymer electrolyte fuel cell. Such an electrode is configured to have, on each side of a polymer electrolyte membrane, a catalyst layer formed on the surface of the polymer electrolyte membrane and a gas diffusion layer formed on the outer side of the catalyst layer. As an individual component for forming a gas diffusion layer of an electrode, gas diffusion electrodes have been distributed. As the required performance of such a gas diffusion electrode, for example, gas diffusivity, electrical conductivity for collecting the electricity generated in the catalyst layer, water drainage for efficiently removing moisture generated on the catalyst layer surface, and the like can be mentioned. In order to obtain such a gas diffusion electrode, generally, an electrically conductive porous substrate having both gas diffusion capability and electrical conductivity is used.

As an electrically conductive porous substrate, specifically, a carbon felt, a carbon paper, a carbon cloth, or the like made of carbon fiber is used. In particular, in terms of mechanical characteristics and the like, carbon papers are believed to be the most preferable.

In addition, a fuel cell is a system that electrically extracts energy generated from a reaction between hydrogen and oxygen to produce water. Therefore, when the electrical load increases, that is, when the current to be extracted outside the cell is increased, a large amount of water (water vapor) is produced. At a low temperature, such water vapor is condensed into water drops, blocking pores of the gas diffusion electrode. As a result, the amount of gas (oxygen or hydrogen) supplied to the catalyst layer decreases, and when all the pores are blocked eventually, power generation ceases (this phenomenon is called "flooding").

In order to minimize the occurrence of flooding, in other words, in order to maximize the current value that causes flooding, a gas diffusion electrode is required to have water drainage. As a means for enhancing the water drainage, usually, a gas diffusion electrode including an electrically conductive porous substrate that has been subjected to a water-repellent treatment is used (see Patent Documents 1, 2, and 3). With respect to the water-repellent treatment, according to a common technique, the above electrically conductive porous substrate is immersed in a dispersion prepared by dispersing a water repellent in water or an organic solvent (see Patent Documents 1, 2, and 3).

In addition, when the water-repellent-treated electrically conductive porous substrate as described above is directly used as a gas diffusion electrode, because its fiber mesh is coarse, large-size water drops are produced as a result of the condensation of water vapor. Thus, this is insufficient for completely suppressing flooding. Therefore, in some cases, on a water-repellent-treated electrically conductive porous substrate, a coating liquid having dispersed therein electrically conductive microparticles, such as carbon black, is applied, then dried, and sintered, thereby providing a so-called microporous layer (see Patent Documents 1, 2, and 3).

For fuel cell vehicle applications, the output of high power is required in the driving modes including starting, high-speed operation, hill-climbing, etc., and thus high output is required. In addition, in order to achieve high output, it is necessary that oxygen or hydrogen from the gas channel of a separator inside the fuel cell passes through the gas diffusion layer and quickly diffuses into the catalyst layer.

For this reason, a gas diffusion electrode is required to have high-level gas diffusivity. Considering such requirements, it is preferable that an electrically conductive porous substrate for a gas diffusion electrode is as thin and porous as possible so as to facilitate the diffusion of gas. When a microporous layer is applied under such circumstances, a coating liquid for forming a microporous layer (so-called microporous layer coating liquid) penetrates into the substrate having a small thickness and a high porosity. In an extreme case, the coating liquid bleeds through to the backside of the substrate, whereby the production process is contaminated with the coating liquid. Therefore, as a result of cleaning, for example, the productivity decreases. In addition, when the microporous layer coating liquid penetrates into the substrate, pores inside the substrate are blocked, making gas diffusion difficult, whereby the power generation performance may decrease.

In order to suppress the penetration of the microporous layer coating liquid into the electrically conductive porous substrate, Patent Document 3 discloses a technique in which the substrate after a water-repellent treatment is sintered to decompose and remove the surfactant in the water repellent, thereby preventing the penetration of a microporous layer to be applied later. However, according to the method disclosed in Patent Document 3, the water-repellent-treated substrate and the microporous layer do not stick well to each other. Thus, there has been a possibility that a part of the microporous layer comes off during the assembling of a fuel cell, whereby the microporous layer cannot achieve its original role.

PRIOR ART DOCUMENTS

Patent Documents

Patent Document 1: Japanese Patent No. 3382213
Patent Document 2: JP 2000-123842 A
Patent Document 3: Japanese Patent No. 3773325

SUMMARY OF THE INVENTION

Problems to be Solved by the Invention

Against the above technical background, an object of the present invention is to provide a gas diffusion electrode having excellent gas diffusivity, in which a microporous layer and an electrically conductive porous substrate stick well to each other.

Solutions to the Problems

In order to solve the above problems, the gas diffusion electrode of the present invention employs the following means. That is, it is a gas diffusion electrode for use in a fuel cell, including an electrically conductive porous substrate and, on at least one side thereof, a microporous layer containing electrically conductive microparticles and a water-repellent resin. The gas diffusion electrode has a through-thickness gas diffusivity of 30% or more, the electrically conductive porous substrate has a sliding-down angle of 70° or less and a porosity of 80% or more, the microporous layer has a thickness of 10 μm or more and 50 μm or less and a porosity of 60% or more and 95% or less.

In addition, in order to solve the above problems, the method for manufacturing a gas diffusion electrode of the present invention employs the following means. That is, it is a method for manufacturing a gas diffusion electrode for use in a fuel cell, including an electrically conductive porous substrate and, on at least one side thereof, a microporous layer containing electrically conductive microparticles and a water-repellent resin, the method including conveying or installing an electrically conductive porous substrate approximately horizontally, and then applying thereto, from below, a microporous layer coating liquid prepared by kneading electrically conductive microparticles, a water-repellent resin, and a dispersion medium, followed by drying and sintering, thereby giving a gas diffusion electrode.

Effects of the Invention

The gas diffusion electrode of the present invention is expected to have the following effects.
  It is possible to provide a gas diffusion electrode having excellent gas diffusivity and capable of high-output power generation.
  The microporous layer and the electrically conductive porous substrate stick well to each other and thus are less likely to cause cracking or the like, making it possible to provide a gas diffusion electrode having excellent durability, in which flooding is less likely to occur.
  It is possible to provide a gas diffusion electrode having fewer defects in appearance, such as the attachment of foreign matters to the microporous layer surface.

In addition, use of the method for manufacturing a gas diffusion electrode of the present invention is expected to have the following effects.
  It is possible to manufacture the gas diffusion electrode of the present invention described above.
  It is possible to manufacture the gas diffusion electrode with high productivity without contaminating the process.

BRIEF DESCRIPTION OF THE DRAWINGS

FIG. 1 shows an example of the configuration of a preferred device for manufacturing the gas diffusion electrode of the present invention.
FIG. 2 shows an example of the configuration of a device for manufacturing a gas diffusion electrode of a comparative example (prior art).
FIG. 3 is a plan view of the device used to perform the water-repellent treatment in the examples and comparative examples.
FIG. 4 is a schematic cross-sectional view of a gas diffusion electrode for explaining the definition of the thickness of each component of the gas diffusion electrode.
FIG. 5 is a cross-sectional view of one cell (single cell) of a polymer electrolyte fuel cell.
FIG. 6 is a schematic diagram of a device for measuring in-plane gas permeability.
FIG. 7 is a schematic diagram for explaining a measurement method for sticking force.

EMBODIMENTS OF THE INVENTION

The gas diffusion electrode of the present invention includes an electrically conductive porous substrate and, on at least one side thereof, a microporous layer containing electrically conductive microparticles and a water-repellent resin such as a fluorine resin.

In a polymer electrolyte fuel cell, a gas diffusion electrode is required to have high gas diffusivity for diffusing a gas supplied from the separator into the catalyst, high water drainage for discharging water produced by the electrochemical reaction into the separator, and high electrical conductivity for extracting the generated current. That is, a sheet-shaped material that transmits gases in the thickness direction and has excellent electrical conductivity is required. Therefore, for the gas diffusion electrode, an electrically conductive porous substrate, which is a substrate having electrical conductivity and made of a porous body usually having an average pore size of 10 μm or more and 100 μm or less, is used. Specifically, as the electrically conductive porous substrate, for example, it is preferable to use a carbon-fiber-containing porous substrate, such as a carbon fiber paper-like body, a carbon felt, a carbon paper, or a carbon cloth, or a metal porous substrate, such as a foamed sintered metal, a metal mesh, or an expanded metal. Among them, in terms of excellent corrosion resistance, it is preferable to use a carbon-fiber-containing porous substrate, such as a carbon felt, a carbon paper, or a carbon cloth. Further, in terms of excellent "springiness", that is, the property of absorbing dimensional changes in the thickness direction of an electrolyte membrane, it is preferable to use a substrate made of carbon fiber paper-like bodies bound together with a carbide, that is, a carbon paper.

Here, the power generation performance of a fuel cell depends significantly on gas diffusivity. Therefore, for applications where high power is required, such as fuel cell vehicles, it is preferable that the thickness of the electrically conductive porous substrate is minimized, and also the porosity is increased, thereby enhancing the gas diffusivity. Therefore, in the present invention, the thickness of the electrically conductive porous substrate is preferably 220 μm or less, more preferably 180 μm or less, still more preferably 150 μm or less, and particularly preferably 120 μm or less. In addition, when the thickness of the electrically conductive porous substrate is too small, the handleability in the process may be deteriorated. Accordingly, under the present circumstances, the lower limit is preferably about 70 μm or about 80 μm.

In addition, when the porosity of the electrically conductive porous substrate is 80% or more, preferably 85% or more, the gas diffusivity is further enhanced. The upper limit of the porosity of an electrically conductive porous substrate industrially producible is about 95%.

Incidentally, the porosity of an electrically conductive porous substrate is determined as follows. Using a microscope such as a scanning electron microscope, 20 different points are selected at random from a cross-section perpendicular to the surface of the electrically conductive porous substrate, and photographed at a magnification of about 20,000. In each image, porous parts and non-porous parts are binarized, and the proportion of the area of porous parts relative to the entire area (the total of the area of porous parts and the area of non-porous parts) is measured. The average proportion of the 20 points is taken as the porosity. As the scanning electron microscope, S-4800 manufactured by Hitachi, Ltd., or its equivalent device, may be used. As a device for producing a cross-section of the electrically conductive porous substrate, Ion Milling Device IM4000 manufactured by Hitachi High-Technologies Corporation, or its equivalent device, may be used.

As the electrically conductive porous substrate, in order to enhance the water drainage for discharging water produced inside the fuel cell, it is necessary to enhance the water repellency. As an index of the water repellency of a substrate, the sliding-down angle of the substrate can be used. In order to enhance the water drainage to make flooding less likely to happen, it is necessary to use an electrically conductive porous substrate having a sliding-down angle of 70° or less, preferably 60° or less, and more preferably 50° or less. The sliding-down angle is the lower the better, but the lower limit of the sliding-down angle measurable is about 1°. Incidentally, the sliding-down angle of a substrate is determined as follows. Ten μl of water is dropped onto the horizontally placed substrate, and, from the horizontal condition, the substrate is gradually inclined. The angle between the substrate surface and the horizontal plane at which the drops of water start to slide down (inclination angle) is taken as the sliding-down angle. When the sliding-down angle measured at least from one side of the electrically conductive porous substrate is 70° or less, this is sufficient as the sliding-down angle of an electrically conductive porous substrate. Therefore, in order to determine the sliding-down angle of an electrically conductive porous substrate in a gas diffusion electrode having a microporous layer formed only on one side, the sliding-down angle can be measured from the side of the gas diffusion electrode having no microporous layer formed (the electrically conductive porous substrate side of the gas diffusion electrode). Meanwhile, in order to determine the sliding-down angle of an electrically conductive porous substrate in a gas diffusion electrode having a microporous layer formed on each side, the sliding-down angle can be measured using the electrically conductive porous substrate before forming the microporous layer.

In order for the sliding-down angle to be within the above range, usually, the electrically conductive porous substrate is subjected to a water-repellent treatment with a water repellent. It is preferable to use a fluorine resin as a water repellent. Examples of fluorine resins include PTFE (polytetrafluoroethylene) (e.g., "Teflon" (registered trademark)), FEP (tetrafluoroethylene-hexafluoropropylene copolymer), PFA (perfluoroalkoxy fluoride resin), ETFA (ethylene-tetrafluoroethylene copolymer), and PVDF (polyvinylidene fluoride), PVF (polyvinyl fluoride). It is preferable to use PTFE or FEP, which develops strong water repellency. PTFE exhibits stronger water repellency, but is less likely to spread into the electrically conductive porous substrate. Therefore, it is preferable to use FEP, which is more likely to spread over the entire carbon fiber forming the electrically conductive porous substrate.

As a result of the water-repellent treatment of the electrically conductive porous substrate with a water repellent, the amount of water repellent attached (sometimes referred to as the amount of water repellent) is to be preferably 1 part by mass or more and 20 parts by mass or less, more preferably 2 parts by mass or more and 10 parts by mass or less, per 100 parts by mass of the electrically conductive porous substrate. When the amount of water repellent is less than 1 part by mass, it is difficult to obtain water repellency sufficient for the sliding-down angle to be within the above range. In addition, when the amount of water repellent is more than 20 parts by mass, pores of the electrically conductive porous substrate may be blocked, causing a decrease in the gas diffusivity or a decrease in the electrical conductivity.

As a method for a water-repellent treatment, generally, a technique in which the treatment is performed by immersion in a water repellent dispersion made of a water repellent and a dispersion medium, such as water, is known. However, with such a treatment technique, it is difficult to control the amount of water repellent attached to the electrically conductive porous substrate. Accordingly, it is more preferable to employ die coating, spray coating, or a like coating technique as the water-repellent treatment method. The water repellent dispersion may be used after moderately diluting the undiluted solution. The viscosity of the water repellent dispersion is usually several mPa·s to several tens of mPa·s. However, for the purpose of controlling the degree of penetration into the electrically conductive porous substrate, it is possible to add a thickener to increase the viscosity before use. However, because it is necessary that the water repellent dispersion penetrates into pores of the electrically conductive porous substrate, the upper limit of viscosity is about 200 mPa·s.

The water repellent dispersion usually contains a surfactant as a dispersant. In order to develop water repellency, the surfactant should be eventually removed by pyrolysis or a like method. However, it is preferable that the surfactant remains at the time of completion of the water-repellent treatment, because this leads to better adhesion with the below-described microporous layer.

A gas diffusion electrode is used as follows. On both sides of an electrolyte membrane having a catalyst layer laminated on each surface, gas diffusion electrodes are placed to sandwich the electrolyte membrane in such a manner that the microporous layer contacts the catalyst layer, thereby forming a membrane electrode assembly. This membrane electrode assembly is incorporated into a single fuel cell. In the case where the operating conditions include a wide range of temperatures and outputs as in vehicle applications, the gas diffusion electrodes are subjected to loads, such as the expansion/contraction or wetting/drying of the electrolyte membrane. Thus, when the adhesion between the microporous layer and the electrically conductive porous substrate in the gas diffusion electrode is low, due to these loads, the microporous layer and the electrically conductive porous substrate may be separated from each other. Therefore, in the case where the electrically conductive porous substrate is subjected to a water-repellent treatment with a water repellent, in order to enhance the adhesion between the microporous layer and the electrically conductive porous substrate, it is preferable that the water repellent is not sintered before the application of a microporous layer coating liquid.

The adhesion between the electrically conductive porous substrate and the microporous layer can be evaluated as follows. After the examination of power generation performance, the membrane electrode assembly is removed from the fuel cell, and the gas diffusion electrode is disassembled; at this time, the adhering condition of the microporous layer to the electrically conductive porous substrate in the gas diffusion electrode can be observed, thereby qualitatively evaluating the adhesion.

As a more practical index of the adhesion between the electrically conductive porous substrate and the microporous layer, the sticking force between the electrically conductive porous substrate and the microporous layer may be employed, and it is preferable that the sticking force is 5 N/cm² or more.

The sticking force between the electrically conductive porous substrate and the microporous layer refers to the maximum tension per unit area of a peeled surface required to peel the microporous layer off the electrically conductive porous substrate, and can be measured using a tensile tester (e.g., "Autograph" (registered trademark) manufactured by Shimadzu Corporation). In the case where a membrane electrode assembly is produced using a gas diffusion electrode having a sticking force of less than 5 N/cm², the microporous layer is easily separated from the electrically conductive porous substrate. This possibly causes inconveniences in that, for example, the produced water accumulates in the region of separation, thereby inhibiting the gas diffusion, or the durability itself decreases.

When the adhesion between the electrically conductive porous substrate and the microporous layer is too high, at the time of measuring the sticking force as described above, the microporous layer or the electrically conductive porous substrate itself undergoes cohesive fracture. Therefore, in such a case, it is substantially impossible to measure the adhesion between the microporous layer and the electrically conductive porous substrate. However, when the value obtained as sticking force is 5 N/cm² or more, in a membrane electrode assembly using such a gas diffusion electrode, the microporous layer and the electrically conductive porous substrate are not separated from each other due to practical loads. Incidentally, although the value of sticking force is greater the better, in the above respects, the upper limit of sticking force measurable is about 50 N/cm².

The present invention is based on the precondition that the gas diffusion electrode includes a microporous layer formed on at least one side of the electrically conductive porous substrate.

It is necessary that the porosity of the microporous layer is 60% or more and 95% or less. When the porosity of the microporous layer is less than 60%, the diffusivity of the gas (hydrogen, air, or oxygen) in the microporous layer is low. In addition, the water drainage in the case where condensed water is generated inside the microporous layer is low, resulting in low power generation performance at a high current density. The porosity of the microporous layer is preferably 70% or more, more preferably 75% or more. Although the porosity of the microporous layer is the higher the better, the upper limit that allows for the maintenance of the structure of the microporous layer when incorporated into a fuel cell is 95%.

Similarly to the porosity of the electrically conductive porous substrate, the porosity of the microporous layer can be measured as follows. Using an ion milling device (IM4000 manufactured by Hitachi High-Technologies Corporation, or its equivalent device, is usable), a through-thickness cross-section perpendicular to the surface of the microporous layer is cut out. Twenty different points are selected at random from the cross-section, and photographed under a microscope, such as a scanning electron microscope, at a magnification of about 20,000 to 50,000. In each image, porous parts and non-porous parts are binarized, and the proportion of the area of porous parts relative to the entire area (the total of the area of porous parts and the area of non-porous parts) is measured. The average proportion of the 20 points is taken as the porosity of the microporous layer (%).

The microporous layer contains electrically conductive microparticles, such as carbon black, carbon nanotube, carbon nanofiber, chopped carbon fiber, graphene, and graphite. As carbon black, it is preferable to use acetylene black, which has a low content of impurities and is less likely to reduce the activity of a catalyst.

Further, in order to enhance the gas diffusivity in the microporous layer, carbon nanofiber, which is capable of forming a coating film having a high porosity, is preferably used as the electrically conductive microparticles.

In addition, the microporous layer is required to have characteristics such as electrical conductivity, gas diffusivity, water drainage, moisture retainability, and thermal conductivity, as well as strong acid resistance on the anode side and oxidation resistance on the cathode side inside a fuel cell. Therefore, in addition to the electrically conductive microparticles, a water-repellent resin, such as a fluorine resin, is contained. Examples of water-repellent resins for use in the microporous layer include, similarly to the water repellents for use in the water-repellent treatment, fluorine resins such as PTFE, FEP, PFA, and ETFA. In terms of having particularly high water repellency, PTFE or FEP is preferable. The water-repellent resin content in the microporous layer is preferably 1 part by mass or more and 50 parts by mass or less per 100 parts by mass of the electrically conductive microparticles. When the water-repellent resin content is less than 1 part by mass, the water-repellent effect cannot be sufficiently obtained. In addition, when the water-repellent resin content is more than 50 parts by mass, pores of the electrically conductive porous substrate are closed with the water-repellent resin, whereby the gas diffusivity may decrease, and also the electrical conductivity of the electrically conductive porous substrate may be impaired. A still more preferred range of the water-repellent resin content is 5 parts by mass or more and 30 parts by mass or less per 100 parts by mass of the electrically conductive microparticles.

In order to provide a microporous layer on the electrically conductive porous substrate, a microporous layer coating liquid is applied to the electrically conductive porous substrate. The microporous layer coating liquid is prepared by kneading the electrically conductive microparticles and water-repellent resin described above, together with a dispersion media such as water or an alcohol. In addition, a surfactant, which functions as a dispersant for dispersing the electrically conductive microparticles and water-repellent resin, is often incorporated into the microporous layer coating liquid.

In terms of productivity, the concentration of the electrically conductive microparticles in the microporous layer coating liquid is 5 mass % or more, preferably 10 mass % or more, based on the entire amount of the coating liquid. There is no upper limit on the concentration as long as the viscosity, the dispersion stability of the electrically conductive microparticles, the coating properties of the coating liquid, and the like are suitable. However, in reality, when the concentration is more than 50 mass %, the suitability as a coating liquid may be impaired. Particularly in the case where acetylene black is used as the electrically conductive microparticles, according to the study by the present inventors, the upper limit is about 25 mass %. When the concentration is higher than this, acetylene black particles are reagglomerated, resulting in so-called percolation, and the coating properties of the coating liquid are impaired due to the rapid increase in viscosity. Such a phenomenon is particularly prominent in the case of a coating liquid using water as a dispersion medium (water-based coating liquid).

The roles of the microporous layer include (1) to protect the catalyst, (2) the refurbishing effect to prevent the rough surface of the electrically conductive porous substrate from being transferred to the electrolyte membrane, (3) to prevent water vapor produced at the cathode from condensing near the catalyst layer, etc. Among them, in order to develop (2) the refurbishing effect, it is necessary that the microporous layer has a certain thickness. For this purpose, it is preferable that the microporous layer coating liquid does not penetrate into the electrically conductive porous substrate much. When the penetration of the microporous layer coating liquid increases, proportionally, the microporous layer to be laminated on the electrically conductive porous substrate surface becomes thinner, making it difficult to obtain the refurbishing effect. In addition, the microporous layer coating liquid that has penetrated into the electrically conductive porous substrate may inhibit gas diffusion in the gas diffusion electrode.

The degree of penetration into the electrically conductive porous substrate may be quantified from the pore size distribution using a mercury porosimeter. Relative to the peak height of the pore size distribution curve of the electrically conductive porous substrate itself (usually present within a pore size range of 10 μm or more and 100 μm or less), as a result of the application of a microporous layer coating liquid, the microporous layer intrudes inside the electrically conductive porous substrate, whereby the peak height decreases. This pore decrement (the proportion of the difference between the peak height of the electrically conductive porous substrate itself and the peak height of the electrically conductive porous substrate having the microporous layer coating liquid intruding inside relative to the peak height of the electrically conductive porous substrate itself (%))" can be used as an index of the degree of penetration and is referred to as "penetration index". In the present invention, it is preferable that the penetration index (pore decrement) is 65% or less.

With respect to the thickness of the microporous layer, considering the surface roughness of the electrically conductive porous substrate under the present circumstances, it is necessary that the thickness is 10 μm or more and 50 μm or less in dry state. A thickness of more than 50 μm results in high electrical resistance of the gas diffusion electrode itself. A still more preferred range of the thickness of the microporous layer is 10 μm or more and 40 μm or less, and the most preferred range of the thickness of the microporous layer is 15 μm or more and 40 μm or less.

The thickness of the microporous layer herein is, as shown in FIG. 4, a value obtained by subtracting the thickness 101A of the electrically conductive porous substrate from the thickness 103A of the gas diffusion electrode. That is, the portion of the microporous layer penetrated into the electrically conductive porous substrate is not included in the thickness of the microporous layer.

Incidentally, the thickness of the gas diffusion electrode and the thickness of the electrically conductive porous substrate can be determined by measurement using a micrometer or the like while applying a load of 0.15 MPa in the direction perpendicular to the surface of the sample to be measured.

The microporous layer coating liquid is prepared by dispersing the electrically conductive microparticles in a dispersion medium (water in the case of a water-based coating liquid) as described above. In order to disperse the electrically conductive microparticles, it is necessary that the dispersant is dispersed in an amount of 0.1 part by mass to 10 parts by mass, at most, per 100 parts by mass of the electrically conductive microparticles. However, in order to stabilize the dispersion for a long period of time to prevent an increase in the viscosity of the coating liquid, thereby preventing separation in the liquid, it is effective to use a surfactant as the dispersant and increase the amount of addition.

In addition, as described above, in the case where the thickness of the microporous layer is made 10 μm or more in dry state, it is preferable to maintain the viscosity of the coating liquid at 1,000 mPa·s or more. When the viscosity of the coating liquid is lower than this, the coating liquid runs over the surface of the electrically conductive porous substrate, or the coating liquid flows into pores of the electrically conductive porous substrate, causing bleed-through. Conversely, when the viscosity of the coating liquid is too high, the coating properties are deteriorated. Therefore, the upper limit of the viscosity of the coating liquid is about 25 Pa·s. A preferred range of the viscosity of the coating liquid is 3,000 mPa·s or more and 20 Pa·s or less, still more preferably 5,000 mPa·s or more and 15 Pa·s or less.

In the present invention, in order to manufacture the gas diffusion electrode efficiently, the electrically conductive porous substrate is conveyed or installed approximately horizontally, and the microporous layer coating liquid is applied thereto from below. According to this configuration, due to the influence of gravity, the penetration of the microporous layer coating liquid into the electrically conductive porous substrate is suppressed. It is necessary that the angle of the electrically conductive porous substrate is approximately horizontal. Although it is most preferable that the substrate is completely horizontal, that is, the angle between the substrate surface and the horizontal plane is 0°, it may also be inclined to some extent. The allowable limit is up to 60° from the horizontal plane. When the substrate is inclined at a larger angle, the penetration increases, and also the liquid is likely to flow downward.

In addition, by applying the microporous layer coating liquid only from below the electrically conductive porous substrate conveyed or installed in this manner, the possibility that dust or the like falling from above attaches to the application surface, resulting in defects in appearance, is reduced.

In the present invention, after the application of the microporous layer coating liquid from below, drying is performed in order to remove the dispersion medium. Drying should also be performed with the penetration of the microporous layer coating liquid into the electrically conductive porous substrate being suppressed. Usually, drying is performed at a temperature within a range of 50° C. or more and 120° C. or less, preferably 60° C. or more and 100° C. or less, and the drying is followed by sintering. Sintering should also be performed with the penetration of the microporous layer coating liquid into the electrically conductive porous substrate being suppressed. However, the drying step and the sintering step do not have to be separate steps, and the sintering step may also serve as drying. Sintering herein means that, in order to fix the electrically conductive microparticles with a water-repellent resin as a binder, thereby forming a microporous layer, a heat treatment is performed at a temperature at which the water-repellent resin melts. As the temperature of sintering, 250° C. or more and 400° C. or less is suitable. When the temperature of sintering is less than 250° C., in the case where a surfactant is used in a water repellent dispersion or a microporous layer coating liquid, it is not sufficiently removed. In addition, when the temperature of sintering is more than 400° C., the water-repellent resin used as a binder may be decomposed.

As described above, the water repellent dispersion or the microporous layer coating liquid often contains, in addition to a dispersion medium, a surfactant to serve as a dispersant or a thickener. However, when it remains in the gas diffusion electrode, the gas diffusivity or electrical conductivity may be impaired. Therefore, it is preferable that the surfactant is removed at the same time as drying the dispersion medium in the water repellent dispersion or the microporous layer coating liquid or by the heat treatment (sintering) performed after drying. The temperature of sintering is suitably set depending on the decomposition temperature of the surfactant used or the melting point of the water-repellent resin used.

As described above, a preferred mode of the gas diffusion electrode manufactured in the present invention is as follows: an electrically conductive porous substrate with the thickness and porosity controlled is subjected to a water-repellent treatment, and a microporous layer coating liquid is applied from below the electrically conductive porous substrate conveyed horizontally, followed by drying and sintering with the penetration of the microporous layer coating liquid into the electrically conductive porous substrate being suppressed, thereby removing the surfactant in the microporous layer coating liquid and the water repellent dispersion so as to prevent a decrease in the gas diffusion capability of the resulting gas diffusion electrode.

With respect to the gas diffusivity of the gas diffusion electrode, it is necessary to consider both the thickness direction of the gas diffusion electrode, that is, the direction perpendicular to the horizontal plane of the gas diffusion electrode, and the in-plane direction of the gas diffusion electrode, that is, the direction of the horizontal plane of the gas diffusion electrode.

By using a gas diffusion electrode having a through-thickness gas diffusivity set at 30% or more, preferably 32% or more, high power generation performance is obtained. The through-thickness gas diffusivity is the higher the better. However, as incorporated into a fuel cell, in order for its structure to be maintained against the pressure applied inside the cell due to the porosity being too high, it is believed that the upper limit is about 40%. Here, the through-thickness gas diffusivity can be measured as follows. That is, the gas to be measured for diffusivity is passed through the one side of the gas diffusion electrode (primary side), while nitrogen gas is passed through the other side (secondary side), and the pressure difference between the primary side and the secondary side is controlled near 0 Pa (0±3 Pa), that is, the condition is set such that there is almost no gas flow due to the pressure difference, and the gas migration phenomenon is caused only by molecular diffusion. The gas concentration at which equilibrium is reached is measured with a gas concentration meter on the secondary side, and the obtained value (%) is taken as an index of the through-thickness gas diffusivity.

Meanwhile, by using a gas diffusion electrode having an in-plane gas permeability set at 25 cc/min or more, even high power generation performance is obtained. FIG. 5 shows a cross-section of a single cell of a polymer electrolyte fuel cell. As shown in FIG. 5, in a single cell of a polymer electrolyte fuel cell, a catalyst layer 202/203 is provided on each surface of an electrolyte membrane 201. A gas diffusion layer 204 is placed on the outer side of each catalyst layer, and further a separator 205 is placed on the outer side of each gas diffusion layer. The separator 205 has formed therein a gas channel 206, through which hydrogen (anode side), oxygen, or air (cathode side) passes. There is a portion called "rib 207" between the gas channels. Unless the gas is supplied to a catalyst layer corresponding to the rib, electric power is not generated in the catalyst layer of the corresponding portion, whereby the power generation performance decreases. Therefore, it is necessary that the gas diffusion layer 204 has the function of dispersing the gas supplied through the gas channel in the in-plane direction, thereby allowing the gas to arrive also at the catalyst layer corresponding to the rib 207 portion. As a required characteristic of the gas diffusion electrode corresponding to this in-plane gas diffusivity, in-plane gas permeability is used. As described below, the in-plane gas permeability is measured using a gas diffusion electrode at a pressure difference of 5 kPa as a basic measurement condition. However, as a measurable limit, measurement is not possible over 190 cc/min. In the case where the permeability is higher than this, the thickness of the gas diffusion electrode is too large, and thus the through-thickness gas diffusivity decreases, or, alternatively, the porosity is so too high, and thus when such a layer is incorporated into a fuel cell as a gas diffusion layer, the structure as the gas diffusion layer cannot be maintained.

When the penetration of the microporous layer coating liquid into the electrically conductive porous substrate cannot be suppressed, the microporous layer on the electrically conductive porous substrate surface has a small thickness. As a result, the "refurbishing effect", which is the original significance of the microporous layer, is reduced. When the amount applied (areal weight) is increased in order to avoid this, the gas diffusivity is impaired.

The electrically conductive porous substrate can be obtained as an electrically conductive porous substrate roll wound in an elongated form. Thus, in the present invention, it is preferable that at the time when the electrically conductive porous substrate is unwound from the electrically conductive porous substrate roll, and a microporous layer coating liquid is applied thereto from below, the electrically conductive porous substrate is conveyed or installed approximately horizontally. Then, after the application of the microporous layer coating liquid from below, while preventing the application surface from contacting the conveying roll, the gas diffusion electrode is dried, sintered, and then wound up by a wind-up machine or the like (i.e., roll-to-roll processing). As a result, a continuous process can be achieved with the penetration of the microporous layer coating liquid into the electrically conductive porous substrate being suppressed, whereby the mass productivity can be enhanced.

EXAMPLES

Hereinafter, the present invention will be described in further detail through Examples. The materials and evaluation methods used in the Examples are shown below.
<Materials>
A: Electrically conductive porous substrate A carbon paper having a thickness of 100 μm and a porosity of 85% was prepared as follows.

Polyacrylonitrile-based carbon fiber "TORAYCA" (registered trademark) T300-6K manufactured by Toray Industries, Inc., (average single-fiber diameter: 7 μm, the number of single fibers: 6,000) was cut to a length of 6 mm, then, using water as a papermaking medium, continuously subjected to papermaking together with broadleaf bleached kraft pulp (LBKP) manufactured by Alabama River and craft market pulp (hardwood), and further immersed in a 10 mass % aqueous solution of polyvinyl alcohol, followed by drying. After this papermaking process, the paper was wound up in roll form, thereby giving a carbon fiber paper in an elongated shape having a carbon staple areal weight of 15 g/m². Per 100 parts by mass of the carbon fiber paper, the amount of pulp added is 40 parts by mass, and the amount of polyvinyl alcohol attached is equivalent to 20 parts by mass.

A dispersion was prepared by mixing Flake Graphite BF-5A (average particle size: 5 µm) manufactured by Chuetsu Graphite Works Co., Ltd., a phenol resin, and methanol in a mass ratio of 2:3:25. The above carbon fiber paper was continuously impregnated with the above dispersion to a resin (phenol resin) impregnation amount of 78 parts by mass per 100 parts by mass of the carbon staple, followed by drying at a temperature of 90° C. for 3 minutes. After this resin impregnation step, the carbon paper was wound up in roll form to give a resin-impregnated carbon fiber paper. As the phenol resin, a resin prepared by mixing a resol-type phenol resin KP-743K and a novolac-type phenol resin TAMANOL 759 manufactured by Arakawa Chemical Industries, Ltd., in a mass ratio of 1:1 was used.

Hot plates were set parallel to each other in a 100-t press manufactured by Kawajiri Co., Ltd., and a spacer was placed on the lower plate. While repeatedly opening and closing the press at a hot plate temperature of 170° C. and a surface pressure of 0.8 MPa, the resin-impregnated carbon fiber paper sandwiched between release papers from the upper and lower sides was intermittently conveyed. At the same time, the carbon fiber paper was subjected to a compression treatment such that one place was heat-pressed for 6 minutes in total. In addition, the effective pressing length LP of the hot plate was 1,200 mm, the feeding length FL of the resin-impregnated carbon fiber paper during intermittent conveying was 100 mm, and LF/LP was set at 0.08. That is, heat-pressing for 30 seconds, opening the press, and sending the carbon fiber paper (100 mm) were repeated to perform the compression treatment, and then the paper was wound up in roll form.

The compression-treated carbon fiber paper was introduced, as a precursor fiber sheet, into a heating furnace at a maximum temperature of 2,400° C. in which a nitrogen gas atmosphere was maintained. While continuously running in the heating furnace, the sheet was fired at a temperature rise rate of about 500° C./min (400° C./min up to 650° C., 550° C./min at a temperature higher than 650° C.). After this carbonizing step, the sheet was wound up in roll form to give a carbon paper. The obtained carbon paper had a density of 0.25 g/cm³ and a porosity of 85%.

A carbon paper having a thickness of 150 µm and a porosity of 85% was obtained in the same manner as for the carbon paper having a thickness of 100 µm and a porosity of 85%, except that the carbon fiber areal weight and the spacer thickness in the compression treatment were changed so that the thickness after carbonization would be 150 µm.

A carbon paper having a thickness of 180 µm and a porosity of 85% was obtained in the same manner as for the carbon paper having a thickness of 100 µm and a porosity of 85%, except that the carbon fiber areal weight and the spacer thickness in the compression treatment were changed so that the thickness after carbonization would be 180 µm.

A carbon paper having a thickness of 100 µm and a porosity of 75% was obtained in the same manner as for the carbon paper having a thickness of 100 µm and a porosity of 85%, except that the carbon fiber areal weight and the phenol resin impregnation amount were changed so that the porosity after carbonization would be 75%.

B: Dispersion medium: Ion exchange water
C: Water repellent or water-repellent resin:
  PTFE resin "POLYFLON" (registered trademark) PTFE dispersion D-210C (manufactured by Daikin Industries, Ltd.)
  FEP resin "POLYFLON" (registered trademark) FEP dispersion ND-110 (manufactured by Daikin Industries, Ltd.)
D: Others
  Surfactant "TRITON" (registered trademark) X-100 (manufactured by Nacalai Tesque, Inc.)
E: Electrically conductive microparticles (carbonaceous powder)
  Carbon black "DENKA BLACK" (registered trademark) (manufactured by Denki Kagaku Kogyo K.K.)

<Measurement of Thickness of Gas Diffusion Electrode, Electrically Conductive Porous Substrate, and Microporous Layer>

For the thickness of a gas diffusion electrode and the thickness of an electrically conductive porous substrate, using a micrometer manufactured by Mitutoyo, measurement was performed while applying a load of 0.15 MPa to the gas diffusion electrode or the electrically conductive porous substrate. The thickness of a microporous layer was determined by subtracting the thickness of the electrically conductive porous substrate from the thickness of the gas diffusion electrode.

<Viscosity Measurement>

In the viscosity measurement mode of a Bohlin rotational rheometer manufactured by Spectris Co., Ltd., using a circular cone plate 40 mm in diameter inclined at 2°, the stress is measured while increasing the rotation speed of the plate (while increasing the share rate). At this time, the value of viscosity at a share rate of 17/sec was taken as the viscosity of the coating liquid.

<Measurement of Porosity of Electrically Conductive Porous Substrate>

Using S-4800 manufactured by Hitachi, Ltd. as a scanning electron microscope, 20 different points were selected at random from a cross-section perpendicular to the surface of an electrically conductive porous substrate, and photographed at a magnification of 20,000. In each image, porous parts and non-porous parts were binarized, then the proportion (%) of the area of porous parts relative to the entire area (the total of the area of porous parts and the area of non-porous parts) was measured, and the average proportion of the 20 points was determined. For the production of the cross-section perpendicular to the surface of the electrically conductive porous substrate, Ion Milling Device IM4000 manufactured by Hitachi High-Technologies Corporation was used.

<Measurement of Porosity of Microporous Layer>

Using IM4000 manufactured by Hitachi High-Technologies Corporation as an ion milling device, a through-thickness cross-section perpendicular to the surface of a microporous layer was cut out. Twenty different points were selected at random from the cross-section, and photographed at a magnification of 20,000 under a scanning electron microscope (S-4800 manufactured by Hitachi, Ltd.). In each image, porous parts and non-porous parts were binarized, then the proportion (%) of the area of porous parts relative to the entire area (the total of the area of porous parts and the area of non-porous parts) was measured, and the average proportion of the 20 points was determined.

<Sliding-Down Angle of Electrically Conductive Porous Substrate>

Using the sliding-down angle measurement mode of an automatic contact angle meter DM501 manufactured by Kyowa Interface Science Co., Ltd., 10 μl of water was dropped onto a sample, and the sample stage was gradually inclined from the horizontal state (inclined at 1°/sec and stopped for 1 second; this is repeated). The incline angle of the sample at which the drops of water began to slide down and disappeared from the measurement screen was taken as the sliding-down angle.

<Amount of Water Repellent Attached>

A square of 5 cm×5 cm was cut from an electrically conductive porous substrate (carbon paper) before a water-repellent treatment, and the mass thereof was measured with an electronic balance. After a water-repellent treatment, the surfactant contained in the water repellent was removed at 380° C. From such an electrically conductive porous substrate, a square of 5 cm×5 cm was similarly cut, and the mass of the sample was measured. An increase in the mass was divided by the mass before the water-repellent treatment and multiplied by 100, thereby determining the amount attached (part by mass) per 100 parts by mass of the electrically conductive porous substrate.

<Gas Diffusivity in Thickness Direction>

Using a steam gas/water vapor permeation diffusion evaluation device (MVDP-200C) manufactured by Seika Corporation, the gas to be measured for diffusivity is passed through one side of the gas diffusion electrode (primary side), while nitrogen gas is passed through the other electrode (secondary side). While controlling the pressure difference between the primary side and the secondary side near 0 Pa (0±3 Pa), the gas concentration at which equilibrium was reached was measured with a gas concentration meter on the secondary side, and the obtained value (%) was taken as the through-thickness gas diffusivity.

<In-Plane Gas Permeability>

Using a steam gas/water vapor permeation diffusion evaluation device (MVDP-200C) manufactured by Seika Corporation, in the pipe system shown in FIG. 6, first, only a valve A (303) is opened, while a valve B (305) is kept closed. A nitrogen gas 313 is passed through the primary-side pipe A (302) to adjust such that a predetermined amount (190 cc/min) of gas flows into a massflow controller (301), and 5 kPa of gas pressure is applied to a pressure controller (304) relative to the atmospheric pressure. A gas diffusion electrode sample (308) is set on a sealant (312) between a gas chamber A (307) and a gas chamber B (309). Next, the valve A (303) is closed, while the valve B (305) is opened, such that the nitrogen gas flows into the pipe B (306). The nitrogen gas flowing into the gas chamber A (307) passes through the space in the gas diffusion electrode sample (308), moves to the gas chamber B (309), passes through a pipe C (310), further passes through a gas flowmeter (311), and is then discharged to the atmosphere. The gas flow (cc/min) through the gas flowmeter (311) at this time was measured, and the obtained value was taken as the in-plane gas permeability.

<Penetration Index: Pore Decrement>

It was quantified from a pore size distribution using a mercury porosimeter. First, the peak height of the pore size distribution curve of an electrically conductive porous substrate itself (usually present within a range of micropore diameters of 10 μm or more and 100 μm or less) was determined. Next, a microporous layer coating liquid was applied to the substrate, and, in the state that the microporous layer coating liquid had intruded inside the electrically conductive porous substrate, the above peak height was measured. Then, the proportion (%) of the difference between the peak height of the electrically conductive porous substrate itself and the peak height of the electrically conductive porous substrate having the microporous layer coating liquid intruding inside relative to the peak height of the electrically conductive porous substrate itself was determined, and used as a penetration index.

<Power Generation Performance>

The obtained gas diffusion electrode was applied to each side of an electrolyte membrane-catalyst layer integrated product (an electrolyte membrane "GORE-SELECT" (registered trademark) manufactured by W.L. Gore & Associates with a catalyst layer "PRIMEA" (registered trademark) manufactured by W.L. Gore & Associates formed on each surface) to sandwich the integrated product in such a manner that the catalyst layer contacted the microporous layer, followed by hot pressing at 130° C. to form a membrane electrode assembly (MEA). This membrane electrode assembly was incorporated into a single cell for a fuel cell, and power generation was performed at a cell temperature of 40° C., a fuel utilization efficiency of 70%, and an air utilization efficiency of 40%, with hydrogen on the anode side and air on the cathode side being humidified to have dew points of 75° C. and 60° C., respectively. While increasing the current density, the value of current density at which power generation ceased (critical current density) was taken as an index of flooding resistance. In addition, the power generation performance under ordinary operating conditions (cell temperature: 70° C.) and high-temperature conditions (cell temperature: 80° C.) was also measured in the same manner.

<Sticking Index>

After the examination of power generation performance, the fuel cell was taken out from the membrane electrode assembly, and the degree of sticking of the microporous layer to the electrically conductive porous substrate in the gas diffusion electrode at the time of disassembling the gas diffusion electrode was qualitatively evaluated according to the following four levels, and taken as an sticking index.

Level 4: Separation is not caused only by disassembling; when forcibly separated, separation occurs between the catalyst layer and the microporous layer.

Level 3: Separation is not caused only by disassembling; when forcibly separated, cohesive fracture occurs in the microporous layer, and most of the microporous layer remains on the electrically conductive porous substrate side.

Level 2: Separation is not caused only by disassembling; when forcibly separated, cohesive fracture occurs in the microporous layer, and the microporous layer remains equally on the electrically conductive porous substrate side and the catalyst layer side.

Level 1: The electrically conductive porous substrate is separated only by disassembling, and almost no microporous layer remains on the electrically conductive porous substrate.

<Sticking Force>

Using the tensile test mode of "Autograph" (registered trademark) AGS-X manufactured by Shimadzu Corporation, the degree of sticking between the microporous layer and the electrically conductive porous substrate was quantified as sticking force. The method for measuring sticking force will be described in detail with reference to FIG. 7. In FIG. 7, the downward arrow means the compression direction, and the upward arrow means the tensile direction. As shown in FIG. 7, a double-stick tape ("NICETACK" (registered trademark) manufactured by Nichiban Co., Ltd., General Type NW-20)

(403) is stuck to the sample supporting surface (2.0 cm×2.0 cm) of each of the upper and lower sample installation jigs (401,402) installed to the tensile tester. A sample (404) prepared by cutting from a gas diffusion electrode to a size of 2.24 cm×2.24 cm was placed on the sample installation jig (402) installed on the lower side of the tester, with the electrically conductive porous substrate surface (405) facing downward. The tester is turned into the compression mode, and the other upper sample installation jig (401) is pressed against the sample from the microporous layer surface (406) side at 400 N (surface pressure: 1 MPa) for 30 seconds. Subsequently, the tester is turned into the tensile test mode, and the upper sample installation jig (401) is raised at a speed of 0.5 mm/sec. The maximum tension applied at that time was divided by the area of the sample (2.24 cm×2.24 cm) and taken as sticking force. Three of the above samples (404) were produced and measured, and their average was employed.

Example 1

Using the wind-up conveying device shown in FIG. 3, a carbon paper having a thickness of 100 μm and a porosity of 85% and wound in roll form was mounted on an unwinding machine 2. The carbon paper 1 was unwound from the unwinding machine 2, and, while being conveyed on a guide roll 3, immersed in an immersion tank 15 filled with a repellent dispersion to perform a water-repellent treatment. The carbon paper 1 was then dried with a dryer 7 set at 100° C. and wound up by a wind-up machine 9, thereby giving a water-repellent-treated electrically conductive porous substrate. As the water repellent dispersion, an FEP dispersion ("POLYFLON" (registered trademark) FEP dispersion ND-110 (manufactured by Daikin Industries, Ltd.)) was diluted with water to an FEP concentration of 2 mass % and used. Incidentally, the sintering furnace 8 was at room temperature, not heated.

Next, using the device as shown in FIG. 1, the water-repellent-treated electrically conductive porous substrate described above was mounted on the unwinding machine 2. While unwinding the water-repellent-treated electrically conductive porous substrate from the unwinding machine 2 and winding it up by the wind-up machine 9, a microporous layer coating liquid was applied from below using a die coater 5 to the horizontally conveyed portion of the electrically conductive porous substrate (the angle between the substrate surface and the horizontal plane: 0°), followed by drying with the dryer 7 and sintering in the sintering furnace 8, thereby giving a gas diffusion electrode.

The microporous layer coating liquid used is as follows. "DENKA-BLACK" (registered trademark) (7.7 parts by mass) manufactured by Denki Kagaku Kogyo K.K., 3.0 parts by mass of an FEP dispersion ("POLYFLON" (registered trademark) ND-110 manufactured by Daikin Industries, Ltd.), 14 parts by mass of a surfactant ("TRITON" (registered trademark) X-100 manufactured by Nacalai Tesque, Inc.), and 75.3 parts by mass of ion exchange water were kneaded in a planetary mixer to adjust the viscosity to 10 Pa·s, thereby giving a microporous layer coating liquid.

The drying after the application of the microporous layer coating liquid was performed at 90° C., and the subsequent sintering was performed at 350° C. The areal weight of the microporous layer after drying and sintering was set at 15 g/m², and the thickness of the microporous layer was set at about 30 μm.

Incidentally, during the application of the microporous layer coating liquid, the coating liquid did not contaminate the rolls at all.

Comparative Example 1

A gas diffusion electrode was prepared in completely the same manner as in Example 1, except that the device equipped with a die coater as shown in FIG. 2 was used in replace of the device of FIG. 1, and the microporous layer coating liquid was applied with the electrically conductive porous substrate being conveyed in the vertical direction. Incidentally, during the application of the microporous layer coating liquid, the coating liquid transmitted through the electrically conductive porous substrate, and contaminated the rolls. Thus, the rolled were cleaned after the completion of application.

Comparative Example 2

A gas diffusion electrode was prepared in completely the same manner as in Comparative Example 1, except that the wind-up conveying device shown in FIG. 3 was used, and, in the formation of the water-repellent-treated electrically conductive porous substrate, the sintering furnace 8 was set at 370° C. to perform sintering at the same time.

During the application of the microporous layer coating liquid, the coating liquid transmitted through the electrically conductive porous substrate, and contaminated the rolls. Thus, the rolled were cleaned after the completion of application. However, there was less contamination as compared with Comparative Example 2.

Example 2

A gas diffusion electrode was prepared in completely the same manner as in Example 1, except that the FEP dispersion used for the water-repellent treatment of a carbon paper and the microporous layer coating liquid in Example 1 was changed to a PTFE resin "POLYFLON" (registered trademark) PTFE dispersion D-210C (manufactured by Daikin Industries, Ltd.), and the sintering temperature was changed to 380° C. As in Example 1, the coating liquid did not contaminate the rolls at all during the application of the microporous layer coating liquid.

Example 3

A gas diffusion electrode was prepared in completely the same manner as in Example 1, except that the FEP dispersion used for the water-repellent treatment of a carbon paper in Example 1 was changed to a PTFE resin "POLYFLON" (registered trademark) PTFE dispersion D-210C (manufactured by Daikin Industries, Ltd.), and the sintering temperature was changed to 380° C. As in Example 1, the coating liquid did not contaminate the rolls at all during the application of the microporous layer coating liquid.

Example 4

A gas diffusion electrode was prepared in completely the same manner as in Example 1, except that the FEP dispersion used for the microporous layer coating liquid in Example 1 was changed to a PTFE resin "POLYFLON" (registered trademark) PTFE dispersion D-210C (manufactured by Daikin Industries, Ltd.), and the sintering temperature was changed to 380° C. As in Example 1, the coating liquid did not contaminate the rolls at all during the application of the microporous layer coating liquid.

Example 5

A gas diffusion electrode was prepared in completely the same manner as in Example 1, except that the carbon paper having a thickness of 100 μm and a porosity of 85% was changed to a carbon paper having a thickness of 150 μm and a porosity of 85%. As in Example 1, the coating liquid did not contaminate the rolls at all during the application of the microporous layer coating liquid.

Example 6

A gas diffusion electrode was prepared in completely the same manner as in Example 1, except that the carbon paper having a thickness of 100 μm and a porosity of 85% was changed to a carbon paper having a thickness of 180 μm and a porosity of 85%. As in Example 1, the coating liquid did not contaminate the rolls at all during the application of the microporous layer coating liquid.

Example 7

A gas diffusion electrode was prepared in completely the same manner as in Example 1, except that the carbon paper having a thickness of 100 μm and a porosity of 85% was changed to a carbon paper having a thickness of 100 μm and a porosity of 75%. As in Example 1, the coating liquid did not contaminate the rolls at all during the application of the microporous layer coating liquid.

Example 8

A gas diffusion electrode was prepared in completely the same manner as in Example 1, except that the amount of microporous layer coating liquid applied in Example 1 was adjusted such that the thickness of the microporous layer would be 45 μm (areal weight: 18 g/m$^2$). As in Example 1, the coating liquid did not contaminate the rolls at all during the application of the microporous layer coating liquid.

Example 9

A gas diffusion electrode was prepared in completely the same manner as in Example 1, except that the amount of microporous layer coating liquid applied in Example 1 was adjusted such that the thickness of the microporous layer would be 70 μm (areal weight: 25 g/m$^2$). As in Example 1, the coating liquid did not contaminate the rolls at all during the application of the microporous layer coating liquid.

Example 10

The microporous layer coating liquid in Example 1 was changed to the following.

"DENKA-BLACK" (registered trademark) (7.7 parts by mass) manufactured by Denki Kagaku Kogyo K.K., 3.0 parts by mass of an FEP dispersion ("POLYFLON" (registered trademark) ND-110 manufactured by Daikin Industries, Ltd.), 3 parts by mass of a surfactant ("TRITON" (registered trademark) X-100 manufactured by Nacalai Tesque, Inc.), and 86.3 parts by mass of ion exchange water were kneaded in a planetary mixer, then dispersed with a bead mill, and defoamed with an aspirator, thereby preparing a coating liquid. The viscosity of the microporous layer coating liquid adjusted was 3.8 Pa·s.

In addition, because of the low viscosity of the coating liquid of the above composition, when the coating liquid was applied once, it was not possible to achieve the thickness of 30 μm. Therefore, the application was performed twice to achieve the thickness of 30 μm. A gas diffusion electrode was prepared in the same manner as in Example 1, except that application was performed twice using this microporous layer coating liquid. The microporous layer applied in this manner was dense, and the porosity was 52%. As in Example 1, the coating liquid did not contaminate the rolls at all during the application of the microporous layer coating liquid.

Example 11

A gas diffusion electrode was produced in completely the same manner as in Example 1, except that the water repellent dispersion in Example 1 was changed to a PTFE resin "POLYFLON" (registered trademark) PTFE dispersion D-210C (manufactured by Daikin Industries, Ltd.) diluted with ion exchange water to 0.2 mass %. Because the water repellent dispersion was diluted, the amount of water repellent attached to the fiber forming the carbon paper was reduced, resulting in a sliding-down angle of 90° or more (sliding-down did not occur even when inclined to 90°). As in Example 1, the coating liquid did not contaminate the rolls at all during the application of the microporous layer coating liquid.

Table 1 summarizes the processing conditions and characteristics of the gas diffusion electrodes produced in the examples and comparative examples. It can be seen that in the examples within the range of the gas diffusion electrode of the present invention, the penetration index is small, and the gas diffusivity is excellent, indicating excellent power generation performance. At the same time, the sticking force is also excellent. In addition, in some of the examples, when the product was outside the range of the gas diffusion electrode of the present invention, the power generation performance and the sticking level were slightly inferior. However, because manufacturing was performed employing the method of the present invention, the microporous layer surface hardly had defects in appearance, such as the attachment of foreign matters, and also the productivity was high without contaminating the process.

TABLE 1

|  |  | Example 1 | Comparative Example 1 | Comparative Example 2 | Example 2 | Example 3 | Example 4 | Example 5 |
|---|---|---|---|---|---|---|---|---|
| Device used (corresponding reference drawing) |  | FIG. 1 | FIG. 2 | FIG. 2 | FIG. 1 | FIG. 1 | FIG. 1 | FIG. 1 |
| Thickness of electrically conductive porous substrate | μm | 100 | 100 | 100 | 100 | 100 | 100 | 150 |
| Porosity of electrically conductive porous substrate | % | 85 | 85 | 85 | 85 | 85 | 85 | 85 |

TABLE 1-continued

| | | | | | | | | |
|---|---|---|---|---|---|---|---|---|
| Kind of water repellent in water-repellent treatment | — | — | FEP | FEP | FEP | PTFE | PTFE | FEP | FEP |
| Amount of water repellent attached | part by mass | | 5 | 5 | 5 | 5 | 5 | 5 | 5 |
| Sliding-down angle of water-repellent-treated electrically conductive porous substrate | ° | | 29 | 32 | 26 | 65 | 65 | 24 | 32 |
| Thickness of microporous layer | μm | | 30 | 30 | 30 | 30 | 30 | 30 | 30 |
| Areal weight of microporous layer | g/m² | | 15 | 20 | 15 | 15 | 15 | 15 | 15 |
| Kind of water-repellent resin of microporous layer | — | | FEP | FEP | FEP | PTFE | FEP | PTFE | FEP |
| Porosity of microporous layer | % | | 67 | 67 | 66 | 69 | 69 | 67 | 67 |
| Penetration index of microporous layer | % | | 61 | 78 | 60 | 62 | 61 | 62 | 57 |
| Contamination of process rolls | — | | None | Contaminated | Partly contaminate | None | None | None | None |
| Though-thickness gas diffusivity of gas diffusion | % | | 33 | 26 | 34 | 32 | 33 | 34 | 31 |
| In-plane gas permeability of gas diffusion electrode | cc/min | | 28 | 19 | 26 | 32 | 38 | 28 | 67 |
| Power generation performance (at 80° C.): High-temperature | A/cm² | | 1.69 | 1.64 | 1.49 | 1.65 | 1.66 | 1.69 | 1.67 |
| Power generation performance (at 70° C.): Normal operation | A/cm² | | 2.25 | 1.83 | 2.01 | 2.23 | 2.3 | 2.28 | 2.12 |
| Power generation performance (at 40° C.): Flooding resistance | A/cm³ | | 1.66 | 1.31 | 1.67 | 1.65 | 1.64 | 1.63 | 1.66 |
| Sticking index of gas diffusion electrode | — | | Level 4 | Level 4 | Level 1 | Level 4 | Level 4 | Level 4 | Level 4 |
| Sticking force of gas diffusion electrode | N/cm⁴ | | 6.5 | 7.2 | 2.3 | 5.7 | 5.4 | 8 | 7.9 |

| | | Example 6 | Example 7 | Example 8 | Example 9 | Example 10 | Example 11 |
|---|---|---|---|---|---|---|---|
| Device used (corresponding reference drawing) | | FIG. 1 | FIG. 1 | FIG. 1 | FIG. 1 | FIG. 1 | FIG. 1 |
| Thickness of electrically conductive porous substrate | μm | 180 | 100 | 100 | 100 | 100 | 100 |
| Porosity of electrically conductive porous substrate | % | 85 | 75 | 85 | 85 | 85 | 85 |
| Kind of water repellent in water-repellent treatment | — | FEP | FEP | FEP | FEP | FEP | PTFE |
| Amount of water repellent attached | part by mass | 5 | 5 | 5 | 5 | 5 | 0.5 |
| Sliding-down angle of water-repellent-treated electrically conductive porous substrate | ° | 35 | 29 | 29 | 29 | 29 | 90 or more |
| Thickness of microporous layer | μm | 30 | 30 | 45 | 70 | 30 | 30 |
| Areal weight of microporous layer | g/m² | 15 | 15 | 18 | 23 | 15 | 15 |
| Kind of water-repellent resin of microporous layer | — | FEP | FEP | FEP | FEP | FEP | FEP |
| Porosity of microporous layer | % | 67 | 67 | 67 | 67 | 52 | 67 |
| Penetration index of microporous layer | % | 54 | 55 | 62 | 66 | 81 | 59 |
| Contamination of process rolls | — | None | None | None | None | None | None |
| Though-thickness gas diffusivity of gas diffusion | % | 27 | 28 | 30 | 28 | 29 | 32 |
| In-plane gas permeability of gas diffusion electrode | cc/min | 85 | 30 | 28 | 28 | 30 | 31 |
| Power generation performance (at 80° C.): High-temperature | A/cm² | 1.61 | 1.47 | 1.7 | 1.44 | 1.45 | 1.55 |
| Power generation performance (at 70° C.): Normal operation | A/cm² | 1.85 | 1.89 | 2.09 | 1.86 | 1.92 | 1.92 |
| Power generation performance (at 40° C.): Flooding resistance | A/cm³ | 1.54 | 1.67 | 1.68 | 1.67 | 1.66 | 1.42 |
| Sticking index of gas diffusion electrode | — | Level 4 | Level 4 | Level 4 | Level 4 | Level 4 | Level 3 |
| Sticking force of gas diffusion electrode | N/cm⁴ | 6 | 5.6 | 6.1 | 5.8 | 6.4 | 7.4 |

DESCRIPTION OF REFERENCE SIGNS

1: Electrically conductive porous substrate (carbon paper)
2: Unwinding machine
3: Guide roll (not driven)
4: Die coater A
5: Die coater B
6: Back roll (driven)
7: Dryer
8: Sintering furnace
9: Wind-up machine
10: Inserting paper 11: Inserting paper unwinding machine
12: Coating liquid tank
13: Liquid supply pump
14: Filter
15: Immersion tank
101: Electrically conductive porous substrate
102: Microporous layer
101A: Thickness of electrically conductive porous substrate
102A: Thickness of microporous layer
103A: Thickness of gas diffusion electrode
201: Electrolyte membrane
202: Anode-side catalyst layer
203: Cathode-side catalyst layer
204: Gas diffusion layer
205: Separator
206: Gas channel
207: Rib
301: Massflow controller
302: Pipe A
303: Valve A
304: Pressure controller
305: Valve B
306: Pipe B
307: Gas chamber A
308: Gas diffusion electrode sample
309: Gas chamber B
310: Pipe C
311: Gas flowmeter
312: Sealant
313: Nitrogen gas
401: Sample installation jig (upper side)
402: Sample installation jig (lower side)
403: Double-stick tape
404: Gas diffusion electrode sample
405: An electrically conductive porous substrate surface
406: Microporous layer surface

The invention claimed is:

1. A gas diffusion electrode for use in a fuel cell, comprising an electrically conductive porous substrate and, on at least one side thereof, a microporous layer containing electrically conductive microparticles and a water-repellent resin,
the gas diffusion electrode having a through-thickness gas diffusivity of 32% or more, and having an in-plane gas permeability of 25 cc/min or more,
wherein the sticking force between the electrically conductive porous substrate and the microporous layer is 5 N/cm$^2$ or more,
the electrically conductive porous substrate having a sliding-down angle of 70° or less, a porosity of 85% or more and having a thickness of 120 μm or less,
the microporous layer having a thickness of 10 μm or more and 40 μm or less and a porosity of 60% or more and 95% or less, and
wherein the electrically conductive microparticles were dispersed by a surfactant to form the microporous layer.

2. The gas diffusion electrode according to claim 1, wherein the electrically conductive porous substrate is a carbon paper.

3. The gas diffusion electrode according to claim 1, wherein the water-repellent resin is polytetrafluoroethylene or a tetrafluoroethylene-hexafluoropropylene copolymer.

4. The gas diffusion electrode for use in a fuel cell according to claim 1, wherein the water-repellant resin comprises tetrafluoroethylene-hexafluoropropylene copolymer, and the electrically conductive porous substrate has a sliding down angle of 60° or less.

5. The gas diffusion electrode according to claim 1, wherein the microporous layer containing electrically conductive microparticles and a water-repellent resin is obtained by applying, from below, a microporous layer coating liquid prepared by kneading electrically conductive microparticles, a water-repellent resin, and a surfactant to an electrically conductive porous substrate which is conveyed or installed approximately horizontally, and followed by drying and sintering, thereby giving the gas diffusion electrode.

6. A gas diffusion electrode for use in a fuel cell, comprising an electrically conductive porous substrate and, on at least one side thereof, a microporous layer containing electrically conductive microparticles and a water-repellent resin,
the gas diffusion electrode having a through-thickness gas diffusivity of 32% or more, and having an in-plane gas permeability of 25 cc/min or more,
wherein the sticking force between the electrically conductive porous substrate and the microporous layer is 5 N/cm$^2$ or more,
the electrically conductive porous substrate having a sliding-down angle of 50° or less, a porosity of 85% or more and having a thickness of 120 μm or less,
the microporous layer having a thickness of 10 μm or more and 40 μm or less and a porosity of 60% or more and 95% or less, and
wherein the electrically conductive microparticles were dispersed by a surfactant.

7. The gas diffusion electrode according to claim 6, wherein the water-repellent resin comprises a tetrafluoroethylene-hexafluoropropylene copolymer.

8. The gas diffusion electrode according to claim 6, wherein the microporous layer containing electrically conductive microparticles and a water-repellent resin is obtained by applying, from below, a microporous layer coating liquid prepared by kneading electrically conductive microparticles, a water-repellent resin, and a surfactant to an electrically conductive porous substrate which is conveyed or installed approximately horizontally, and followed by drying and sintering, thereby giving the gas diffusion electrode.

9. A method for manufacturing a gas diffusion electrode for use in a fuel cell, including an electrically conductive porous substrate and, on at least one side thereof, a microporous layer containing electrically conductive microparticles and a water-repellent resin,
the method comprising conveying or installing an electrically conductive porous substrate approximately horizontally, and then applying thereto, from below, a microporous layer coating liquid prepared by kneading electrically conductive microparticles, a water-repellent resin, and a surfactant, followed by drying and sintering, thereby giving a gas diffusion electrode according to claim 1.

10. The method for manufacturing a gas diffusion electrode according to claim 9, wherein the electrically conductive porous substrate is subjected to a water-repellent treatment with a water repellent before the application of the microporous layer coating liquid, and the water repellent is not sintered.

11. The method for manufacturing a gas diffusion electrode according to claim 9, wherein the electrically conductive porous substrate conveyed or installed approximately horizontally is unwound from an electrically conductive porous substrate roll wound in an elongated form, and, after the application of the microporous layer coating liquid from below, the gas diffusion electrode is wound up, while preventing the application surface from contacting a conveying roll.

12. The method for manufacturing a gas diffusion electrode according to claim 9, wherein the microporous layer coating liquid applied from below is dried with the penetration thereof into the electrically conductive porous substrate being suppressed.

13. The method for manufacturing a gas diffusion electrode according to claim 9, wherein the microporous layer coating liquid applied from below is dried and sintered with the penetration thereof into the electrically conductive porous substrate being suppressed.

14. The method for manufacturing a gas diffusion electrode according to claim 9, wherein the microporous layer coating liquid is applied only from below.

15. The method for manufacturing a gas diffusion electrode according to claim 9, wherein the microporous layer coating liquid has a viscosity of 1,000 mPa·s or more.

* * * * *